United States Patent
Huang et al.

(10) Patent No.: US 11,961,409 B1
(45) Date of Patent: Apr. 16, 2024

(54) AIR-GROUND JOINT TRAJECTORY PLANNING AND OFFLOADING SCHEDULING METHOD AND SYSTEM FOR DISTRIBUTED MULTIPLE OBJECTIVES

(71) Applicant: Nanjing University of Aeronautics and Astronautics, Nanjing (CN)

(72) Inventors: Yang Huang, Nanjing (CN); Miaomiao Dong, Nanjing (CN); Xinyu Zhu, Nanjing (CN); Wei Wang, Nanjing (CN); Wenqiang Liu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/522,311

(22) Filed: Nov. 29, 2023

(30) Foreign Application Priority Data

Jul. 5, 2023 (CN) .......................... 202310813910.0

(51) Int. Cl.
  *G08G 5/00* (2006.01)
(52) U.S. Cl.
  CPC ......... *G08G 5/0069* (2013.01); *G08G 5/0021* (2013.01); *G08G 5/003* (2013.01)
(58) Field of Classification Search
  CPC ..... G08G 5/0069; G08G 5/0021; G08G 5/003
  See application file for complete search history.

(56) References Cited

U.S. PATENT DOCUMENTS

| | | | |
|---|---|---|---|
| 2021/0266834 A1* | 8/2021 | Hu | .......................... H04W 4/46 |
| 2023/0026782 A1 | 1/2023 | Sha et al. | |

FOREIGN PATENT DOCUMENTS

| | | |
|---|---|---|
| CN | 110207712 A | 9/2019 |
| CN | 112351503 A | 2/2021 |
| CN | 113286314 A | 8/2021 |
| CN | 114599102 A | 6/2022 |
| CN | 115454527 A | 12/2022 |
| CN | 115640131 A | 1/2023 |
| WO | 2021003709 A1 | 1/2021 |

OTHER PUBLICATIONS

S. Du, X. Chen, L. Jiao and Y. Lu, "Energy Efficient Task Offloading for UAV-assisted Mobile Edge Computing," 2021 China Automation Congress (CAC), Beijing, China, 2021, pp. 6567-6657 (Year: 2021).*

* cited by examiner

*Primary Examiner* — Shon G Foley
(74) *Attorney, Agent, or Firm* — Bayramoglu Law Offices LLC

(57) ABSTRACT

An air-ground joint trajectory planning and offloading scheduling method and system for distributed multiple objectives is provided. At the beginning of each timeslot, an unmanned aerial vehicle (UAV) selects a flight direction based on a total energy consumption of all devices and a total amount of unprocessed data of all the devices in the current system, and flies a fixed distance towards a certain direction. Before the UAV reaches a new location, each terrestrial user independently selects a task data offloading scheduling strategy based on the total energy consumption of all the devices and the total amount of the unprocessed data of all the devices in the current system. In order to improve an expected long-term average energy efficiency and data processing capability, the present disclosure also provides average feedbacks for an energy consumption and unprocessed data.

6 Claims, 5 Drawing Sheets

AIR-GROUND JOINT TRAJECTORY PLANNING AND OFFLOADING SCHEDULING METHOD AND SYSTEM FOR DISTRIBUTED MULTIPLE OBJECTIVES

CROSS REFERENCE TO THE RELATED APPLICATIONS

This application is based upon and claims priority to Chinese Patent Application No. 202310813910.0, filed on Jul. 5, 2023, the entire contents of which are incorporated herein by reference.

TECHNICAL FIELD

The present disclosure relates to the technical field of wireless communications, specifically to an air-ground joint trajectory planning and offloading scheduling method and system for distributed multiple objectives.

BACKGROUND

With the popularity of 5th Generation Mobile Communication Technology (5G) and the wide application of mobile edge computing (MEC) technology, task data generated by a large number of devices need to be offloaded to an edge server with high computing power for processing. However, existing MEC is not suitable for a scenario with a computation-intensive and latency-critical task. Flexibility and high maneuverability of an unmanned aerial vehicle (UAV), especially a high-probability line-of-sight link channel, provide a more reliable connection for communication and multi-user scheduling and resource allocation. In addition, in the context of UAV-assisted MEC, the most advanced research focuses on a scenario in which a terrestrial device can determine to execute a computing task locally or offload the computing task to the UAV, regardless of a situation in which a base station (BS) cooperates with the UAV to provide a service for a terminal, which is not applicable to an actual scenario. Moreover, considering high dynamic performance of a real environment, a channel gain and a statistical characteristic that are generated by the computing task are unknown, and deterministic optimization may vary with time, but unpredictable channel propagation cannot achieve a good solving result.

There are also some task offloading scheduling methods in the prior art. For example, the invention patent with the Patent Application No. CN114599102A and entitled "Method for Offloading Linearly Dependent Task of UAV-Assisted Edge Computing Network" uses convex optimization and dynamic programming algorithms to jointly optimize an offloading decision, resource allocation, and a UAV trajectory to minimize an energy consumption. For another example, the invention patent with the Patent Application No. CN113286314A and entitled "Method for Base Station Deployment and User Association Based on Q-Learning Algorithm" utilizes a table-based Q-learning method to jointly optimize BS deployment and user association for the UAV to maximize the sum of transmission rates of users within a system. However, none of the above methods takes into account simultaneous optimization and solving for a plurality of objectives such as a demand of a user for the computing task and a system energy consumption.

SUMMARY

In view of the deficiencies in the prior art, the present disclosure provides an air-ground joint trajectory planning and offloading scheduling method and system for distributed multiple objectives.

To achieve the above objective, the present disclosure adopts following technical solutions:

An air-ground joint trajectory planning and offloading scheduling method for distributed multiple objectives is provided, where in the method, a UAV fixed at a flight altitude and a terrestrial BS at a fixed location jointly serve a plurality of terrestrial users at fixed locations, and the method specifically includes the following steps:

step 1: obtaining, by the UAV, current state information, where the state information includes a location of the UAV in a current timeslot t and a total amount of unprocessed data of all devices in a previous timeslot t−1, and all the devices include the UAV, the BS, and the plurality of users;

step 2: selecting, by the UAV, an action, selecting a flight direction from a preset flight direction set by minimizing a total energy consumption of all the devices and a total amount of unprocessed data of all the devices, and flying a fixed distance;

step 3: before the UAV reaches a new location, obtaining, by each user, current state information;

step 4: selecting, by all the users, an action in parallel, determining a task offloading scheduling method of each user from a preset offloading strategy set by minimizing the total energy consumption of all the devices and the total amount of the unprocessed data of all the devices, and executing the task offloading scheduling method in the current timeslot t;

step 5: after task offloading scheduling of the users is completed in the current timeslot t, updating the location of the UAV as a location in a next timeslot t+1, where the UAV and each user receive a feedback for a current action; and step 6: repeating steps 1 to 5 in each timeslot to obtain an optimal flying and offloading strategy based on the state information and the feedback for the current action, where the flying and offloading strategy includes the flight direction of the UAV and the task offloading scheduling method of each user.

In order to optimize the technical solution, the following specific measures are also used.

Further, the flight direction set includes eight flight directions: up, down, left, right, upper right, lower right, upper left, and lower left; and the offloading strategy set includes three task offloading scheduling methods: local computing, offloading to the UAV, and offloading to the BS.

Further, the total energy consumption of all the devices is calculated according to a following formula:

$$D_t = \sum_{m=1}^{m=M} (D_{m,t}) + D_{UAV,t} + D_{BS,t}$$

where $D_t$ represents a total energy consumption of all the devices in the timeslot t, M represents a quantity of users, $m \in \{1, 2, \ldots, M\}$, and $D_{m,t}$, $D_{UAV,t}$ and $D_{BS,t}$ respectively represent cumulative computing tasks in queues of a user m, the UAV, and the BS in the timeslot t; and the total amount of the unprocessed data of all the devices is calculated according to a following formula:

$$E_t = \sum_{m=1}^{M} \left( (E_{UAV,m,t}^{trans} + E_{UAV,m,t}^{cp}) \cdot \alpha_{m,t,UAV} + \right.$$

$$\left. (E_{BS,m,t}^{trans} + E_{BS,m,t}^{cp}) \cdot \alpha_{m,t,BS} + E_{UE,m,t}^{cp} \cdot \alpha_{m,t,UE} \right.$$

where $E_t$ represents a total amount of unprocessed data of all the devices in the timeslot t, $E_{UAV,m,t}^{trans}$ and $E_{BS,m,t}^{trans}$ respectively represent transmission energy consumptions of offloading a task by the user m to the UAV and the BS in the timeslot t, $E_{UAV,m,t}^{cp}$ and $E_{BS,m,t}^{cp}$ respectively represent energy consumptions of computing the task by the user m on the UAV and the BS in the timeslot t, and $\alpha_{m,t,UE}$, $\alpha_{m,t,UAV}$, and $\alpha_{m,t,BS}$ respectively represent operations of performing local computing, offloading to the UAV, and offloading to the BS by the user m in the timeslot t, where when the local computing is performed, $\alpha_{m,t,UE}=1$, otherwise $\alpha_{m,t,UE}=0$; when the offloading to the UAV is performed, $\alpha_{m,t,UAV}=1$, otherwise $\alpha_{m,t,UAV}=0$; and when the offloading to the BS is performed, $\alpha_{m,t,BS}=1$, otherwise $\alpha_{m,t,BS}=0$.

Further, the feedback for the current action is as follows:

$$\bar{r} = [\bar{E}, \bar{D}]^T$$

$$\bar{E} = \lim_{T \to \infty} \sup \frac{1}{T} \varepsilon \left\{ \sum_{t=0}^{T-1} e_t \right\}$$

$$\bar{D} = \lim_{T \to \infty} \sup \frac{1}{T} \varepsilon \left\{ \sum_{t=0}^{T-1} d_t \right\}$$

where $\bar{r}$ represents a column vector of the feedback, $[\ ]^T$ represents transposition, $\bar{E}$ represents an average feedback for an energy consumption, $\bar{D}$ represents an average feedback for unprocessed data, T represents duration of the task, $$\sup \frac{1}{T}$$

represents an upper bound of $$\frac{1}{T},$$

$\varepsilon\{\ \}$ represents averaging, $e_t = -E_t$, and $d_t = -D_t$.

Further, the optimal flying and offloading strategy is determined according to a following formula:

$$\pi = \text{argmax}_\pi \{w_r^T \bar{r}\}$$

$$w_r = [w_e, w_d]^T$$

where $\pi$ represents the optimal flying and offloading strategy, $w_r$ represents a weight vector, $w_r^T$ represents transposition of $w_r$, and $w_e$ and $w_d$ respectively represent weight values for the energy consumption and an amount of the unprocessed data.

In addition, the present disclosure also provides an air-ground joint trajectory planning and offloading scheduling system for distributed multiple objectives, where all devices of the system include a UAV fixed at a flight altitude, a terrestrial BS at a fixed location, and a plurality of terrestrial users at fixed locations, and the UAV and the BS jointly serve the plurality of terrestrial users;

the UAV is configured to perform following operations: obtaining current state information, where the state information includes a location of the UAV in a current timeslot t and a total amount of unprocessed data of all the devices in a previous timeslot t−1; selecting an action by minimizing a total energy consumption of all the devices and a total amount of unprocessed data of all the devices, selecting a flight direction from a preset flight direction set, and flying a fixed distance; after task offloading scheduling of the users is completed in the current timeslot t, updating the location as a location in a next timeslot t+1; and receiving a feedback for a current action, and obtaining an optimal flying strategy based on the state information and the feedback for the current action in the next timeslot; and the user is configured to perform following operations: before the UAV reaches a new location, obtaining, by each user, current state information; selecting, by all the users, an action in parallel, determining a task offloading scheduling method of each user from a preset offloading strategy set by minimizing the total energy consumption of all the devices and the total amount of the unprocessed data of all the devices, and executing the task offloading scheduling method in the current timeslot t; and receiving the feedback for the current action, and obtaining an optimal offloading strategy based on the state information and the feedback for the current action in the next timeslot.

Further, the flight direction set includes eight flight directions: up, down, left, right, upper right, lower right, upper left, and lower left; and the offloading strategy set includes three task offloading scheduling methods: local computing, offloading to the UAV, and offloading to the BS.

Further, the total energy consumption of all the devices is calculated according to a following formula:

$$D_t = \sum_{m=1}^{m=M} (D_{m,t}) + D_{UAV,t} + D_{BS,t}$$

where $D_t$ represents a total energy consumption of all the devices in the timeslot t, M represents a quantity of users, $m \in \{1, 2, \ldots, M\}$, and $D_{m,t}$, $D_{UAV,t}$, and $D_{BS,t}$ respectively represent cumulative computing tasks in queues of a user m, the UAV, and the BS in the timeslot t; and the total amount of the unprocessed data of all the devices is calculated according to a following formula:

$$E_t = \sum_{m=1}^{M} \left( (E_{UAV,m,t}^{trans} + E_{UAV,m,t}^{cp}) \cdot \alpha_{m,t,UAV} + \right.$$

$$\left. (E_{BS,m,t}^{trans} + E_{BS,m,t}^{cp}) \cdot \alpha_{m,t,BS} + E_{UE,m,t}^{cp} \cdot \alpha_{m,t,UE} \right)$$

where $E_t$ represents a total amount of unprocessed data of all the devices in the timeslot t, $E_{UAV,m,t}^{trans}$ and $E_{BS,m,t}^{trans}$ respectively represent transmission energy consumptions of offloading a task by the user m to the UAV and the BS in the timeslot t, $E_{UAV,m,t}^{cp}$ and $E_{BS,m,t}^{cp}$ respectively represent energy consumptions of computing the task by the user m on the UAV and the BS in the timeslot t, and $\alpha_{m,t,UE}$, $\alpha_{m,t,UAV}$, and $\alpha_{m,t,BS}$ respectively represent operations of performing local computing, offloading to the UAV, and offloading to the BS by the user m in the timeslot t, where when the local computing is performed, $\alpha_{m,t,UE}=1$, otherwise $\alpha_{m,t,UE}=0$; when the offloading to the UAV is performed, $\alpha_{m,t,UAV}=1$, otherwise $\alpha_{m,t,UAV}=0$; and when the offloading to the BS is performed, $\alpha_{m,t,BS}=1$, otherwise $\alpha_{m,t,BS}=0$.

Further, the feedback for the current action is as follows:

$$\bar{r} \triangleq [\bar{E}, \bar{D}]^T$$

-continued $$\bar{E} = \lim_{T \to \infty} \sup \frac{1}{T} \varepsilon \left\{ \sum_{t=0}^{T-1} e_t \right\}$$

$$\bar{D} = \lim_{T \to \infty} \sup \frac{1}{T} \varepsilon \left\{ \sum_{t=0}^{T-1} d_t \right\}$$

where $\bar{r}$ represents a column vector of the feedback, $[\ ]^T$ represents transposition, $\bar{E}$ represents an average feedback for an energy consumption, $\bar{D}$ represents an average feedback for unprocessed data, T represents duration of the task, $$\sup \frac{1}{T}$$

represents an upper bound of $$\frac{1}{T},$$

$\varepsilon\{\ \}$ represents averaging, $e_t = -E_t$, and $d_t = -D_t$.

Further, the optimal flying strategy and the optimal offloading strategy are determined according to a following formula:

$$\pi = \operatorname{argmax}_\pi \{w_r^T \bar{r}\}$$

$$w_r = [w_e, w_d]^T$$

where $\pi$ represents the optimal flying and offloading strategy, $w_r$ represents a weight vector, $w_r^T$ represents transposition of $w_r$, and $w_e$ and $w_d$ respectively represent weight values for the energy consumption and an amount of the unprocessed data.

The present disclosure has following beneficial effects: The multi-objective method and system based on a distributed framework in the present disclosure can express a decision-making process of trajectory planning/offloading scheduling as independent Markov decision-making processes, enabling the UAV and the terrestrial user to optimize the trajectory planning and the offloading scheduling by minimizing the energy consumption and a task bit backlog, and also considers matching of time and space resources in a highly dynamic network environment, in other words, in a situation where all channel information is unknown. The present disclosure effectively avoids a curse of dimensionality caused by an increase in the quantity of users and an exponential increase in state/action space, can effectively resolve inherent problems of poor timeliness and inapplicability to a large-scale user scenario in a centralized method, and can also ensure an overall low energy consumption and task bit backlog of the system.

DETAILED DESCRIPTION OF THE EMBODIMENTS

The present disclosure will be described in further detail below in combination with accompanying drawings.

Embodiment 1

Figure 1:
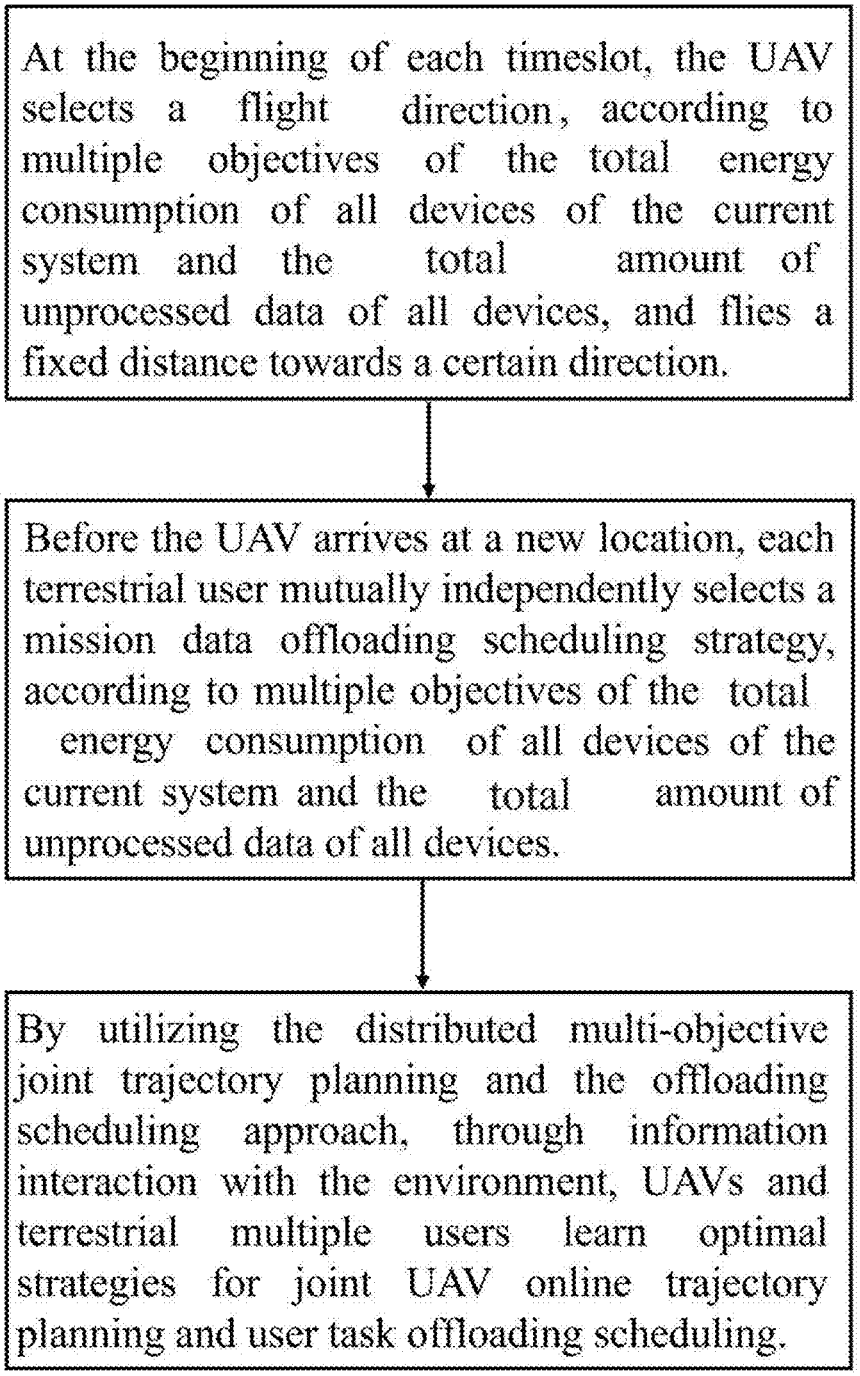
FIG. 1 is a flowchart showing main steps of an air-ground joint trajectory planning and offloading scheduling method for distributed multiple objectives according to the present disclosure.
Figure 3:
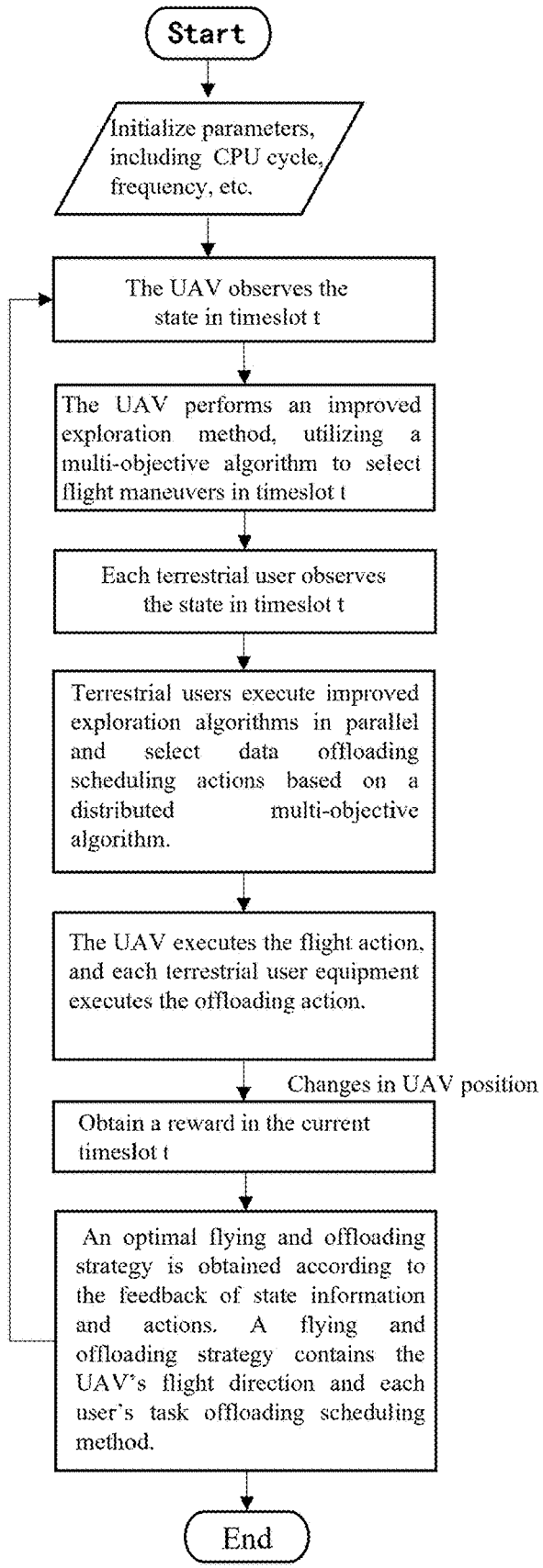
FIG. 3 is a flowchart showing specific operations of an air-ground joint trajectory planning and offloading scheduling method for distributed multiple objectives according to the present disclosure.

As shown in FIG. 1 and FIG. 3, this embodiment provides an air-ground joint trajectory planning and offloading scheduling method for distributed multiple objectives. In an air-ground collaborative network studied in this embodiment, a scenario in which a UAV fixed at a flight altitude H and a BS located at a fixed location jointly serve M users (UEs) at fixed locations. For ease of explanation, duration T of a task is divided into N equal timeslots. In order to maintain an approximately-constant flight trajectory of the UAV within a timeslot, length $\delta_t = T/N$ of the timeslot should be appropriately selected. The UAV, the BS, and the user are all located in a three-dimensional coordinate system. Assuming that horizontal and vertical coordinates of the UAV in timeslot t are $x_t$ and $y_t$ respectively, and an altitude is constantly H, three-dimensional coordinates of the UAV in the timeslot t can be expressed as $q_{UAV,t} = [x_t, y_t, H]$. If horizontal and vertical coordinates of an $m^{th}$ user are $x_m$ and $y_m$ respectively, and an altitude is 0, three-dimensional coordinates of the $m^{th}$ user can be expressed as $q_m = [x_m, y_m, 0]$.

In each timeslot t, for each user, offloading scheduling options include executing a computing task locally by the user, and offloading the computing task to the UAV or the BS by the user, which are mutually exclusive. Assuming there are sufficient frequency domain channels, offloading transmission terminals will not interfere with each other, and computing results can be returned to the terminal through a dedicated frequency domain channel. Processing devices of each user, the BS, and the UAV each are equipped with a local task queue to buffer unprocessed data. Variable $\alpha_{m,t,P} = \{0, 1\}$, $P \in \{UE, UAV, BS\}$ represents operations of performing local computing, offloading to the UAV, and offloading to the BS by the $m^{th}$ user in the timeslot t. When the $m^{th}$ user performs local processing in the timeslot t, $\alpha_{m,t,UE} = 1$; otherwise, $\alpha_{m,t,UE} = 0$. The same applies to the offloading to the UAV and the BS by the $m^{th}$ user in the timeslot t. At the end of timeslot $t-1$, an amount of unprocessed data in the task queue of the $m^{th}$ user is $D_{m,t-1}$. Similarly, at the end of the timeslot $t-1$, quantities of unprocessed task bits in the task queues of the UAV and the terrestrial BS can be represented as $D_{BS,t-1}$ and $D_{UAV,t-1}$ respectively.

The following analyzes changes in a quantity of processed task bits and an energy consumption in the queue in the timeslot t in both local computing and offloading scenarios.

When the $m^{th}$ user performs the local computing in the timeslot t, in other words, $\alpha_{m,t,UE}=1$, the task is not offloaded to the UAV or the terrestrial BS, and only an energy consumption of the local computing is generated. Therefore, the energy consumption of the local computing performed by the $m^{th}$ user in the timeslot t is $E_{UE,m,t}^{cp}$. At the end of the timeslot t, an amount of unprocessed data in the task queue of the $m^{th}$ user is represented by $D_{m,t}$.

When the $m^{th}$ user performs the offloading operation in the timeslot t, the $m^{th}$ terrestrial user offloads the task to an edge computing server located on the UAV or the terrestrial BS in one timeslot. During transmission, a transmission energy consumption is generated. Therefore, a transmission energy consumption of offloading the task by the $m^{th}$ user to the UAV in the timeslot t can be expressed as $E_{UAV,m,t}^{trans}$. A transmission energy consumption of offloading the task by the $m^{th}$ user to the terrestrial BS in the timeslot t can be expressed as $E_{BS,m,t}^{trans}$. When the task is computed on the UAV or the terrestrial BS, an energy consumption of computing the task is generated. Therefore, an energy consumption of computing the task by the $m^{th}$ user on the UAV in the timeslot t can be expressed as $E_{UAV,m,t}^{cp}$. An energy consumption of computing the task by the $m^{th}$ user on the terrestrial BS in the timeslot t can be expressed as $E_{BS,m,t}^{cp}$. Similarly, at the end of the timeslot t, quantities of unprocessed task bits in the task queues of the UAV and the terrestrial BS can be represented as $D_{UAV,t}$ and $D_{BS,t}$ respectively.

Therefore, a total transmission and computing energy consumption of all devices (the terrestrial user, the UAV, and the terrestrial BS) in the system in the timeslot t is as follows:

$$E_t = \sum_{m=1}^{M} \left( \left(E_{UAV,m,t}^{trans} + E_{UAV,m,t}^{cp}\right) \cdot \alpha_{m,t,UAV} + \left(E_{BS,m,t}^{trans} + E_{BS,m,t}^{cp}\right) \cdot \alpha_{m,t,BS} + E_{UE,m,t}^{cp} \cdot \alpha_{m,t,UE} \right)$$

A total amount of unprocessed data in queues of all the devices (the terrestrial user, the UAV, and the terrestrial BS) in the system in the timeslot t is as follows:

$$D_t = \sum_{m=1}^{m=M} (D_{m,t}) + D_{UAV,t} + D_{BS,t}$$

In the system, negative values of the total energy consumption and the total amount of the unprocessed data of all the devices in the current system are respectively represented as $e_t=-E_t$ and $d_t=-D_t$ in this embodiment.

This embodiment achieves dynamic task offloading scheduling of the terrestrial user and trajectory planning of the UAV by minimizing the total energy consumption and the total amount of the unprocessed data of all the devices in the current system. Intuitively, in order to determine a flight direction of the UAV or an offloading decision of the $m^{th}$ user in timeslot t+1, the UAV or the $m^{th}$ user must rely on an observed state, in other words, a location of the UAV in the timeslot t, and a total amount of unprocessed data of all the devices in previous timeslot t-1. Therefore, dynamic offloading scheduling and trajectory planning problems have become independent Markov process decision-making problems. In order to avoid a curse of dimensionality, a distributed multi-agent model can be used. In this embodiment, all distributed (terrestrial) users select an action in a distributed and parallel manner, that is, each terrestrial user makes a decision only to determine its own task offloading scheduling strategy, and task offloading scheduling strategies of all the terrestrial users do not interfere with each other.

In the timeslot t, the UAV and each user have same state information, and the UAV and the terrestrial user each make a decision based on the state information. Specifically, the UAV selects the flight direction, and each user selects a task offloading strategy. State $s_t$ observed by the UAV in the timeslot t can be defined as the location of the UAV in the timeslot t and the total amount of the unprocessed data of all the devices in the previous timeslot t-1, in other words, $s_t=[q_{UAV,t},d_{t-1}]$. For the UAV, in the given state $s_t$, the flight direction determined in the timeslot t can be defined as $a_{t,UAV} \in A_{UAV}$. That is, the UAV selects a flight direction from preset direction set $A_{UAV}$ (such as {up, down, left, right, upper right, lower right, upper left, and lower left}). The location of the UAV remains unchanged until $a_{t,UAV}$ is executed at the end of the timeslot t. For the $m^{th}$ terrestrial user, in the given state $s_t$, an offloading scheduling action determined by the $m^{th}$ terrestrial user in the timeslot t can be defined as $a_{t,m} \in A_m$. That is, the $m^{th}$ terrestrial user determines task offloading scheduling method $a_{t,m}$ for the $m^{th}$ terrestrial user in the timeslot t from preset task offloading strategy set $A_m$={local computing, offloading to the UAV, and offloading to the BS}. Each user performs task offloading based on an offloading scheduling decision, and then obtains the negative value $e_t$ of the total energy consumption of all the devices in the system in the timeslot t, as well as the negative value $d_t$ of the total amount of the unprocessed data of all the devices in the system in the timeslot t.

Therefore, this embodiment also defines a feedback of an environment for an action in the timeslot t as vector $r_t=[e_t, d_t]$ to evaluate an overall energy consumption and an overall task bit backlog. In order to improve an expected long-term average energy efficiency and data processing capability, this embodiment provides a concept of an average feedback. For an average feedback $\overline{E}$ of the energy consumption and an average feedback $\overline{D}$ of the unprocessed data, time accumulation is performed on the energy consumption $e_t$ and the data accumulation $d_t$, and then averaging is performed (namely $$\varepsilon\left\{\sum_{t=0}^{T-1} e_t\right\}$$

and $$\varepsilon\left\{\sum_{t=0}^{T-1} d_t\right\}$$

). After that, obtained average values are multiplied by an upper bound (namely $$\sup \frac{1}{T}$$

) of 1/T to obtain limit values, which can be obtained from $$\bar{E} = \lim_{T \to \infty} sup \frac{1}{T} \varepsilon \left\{ \sum_{t=0}^{T-1} e_t \right\}$$

and $$\bar{D} = \lim_{T \to \infty} sup \frac{1}{T} \varepsilon \left\{ \sum_{t=0}^{T-1} d_t \right\}$$

respectively. Further, the limit values are collected in a column vector, which is represented as $\bar{r}=[\bar{E},\bar{D}]^T$. The total energy consumption and the total amount of the unprocessed data of all the devices in the system are assigned different weight values to represent a preference of the UAV or the terrestrial user for the above two different optimization objectives. The weight values of the energy consumption and the amount of the unprocessed data can be represented as $w_e$ and $w_d$ respectively to form a 2×1 column vector. In other words, a weight vector can be represented as $w_r=[w_e, w_d]^T$. The optimization of flight/offloading strategy $\pi$ is a deterministic strategy from the state space of the UAV/terrestrial user to the action space of the UAV/terrestrial user. That is, for a given state, an optimal flying and offloading strategy in the state can be obtained, which can be expressed mathematically as $\pi=\mathrm{argmax}_\pi\{w_r^T\bar{r}\}$.

In a simulation setting, the flight direction set of the UAV includes eight basic directions, namely A0=[up; down; left; upper left; upper right; lower left; and lower right], and a fixed altitude is set to H=100 m. In addition, a quantity of terrestrial users is set to M=5, and the weight vector $w_r$ is set to $w_e=1$ and $w_d=1$. The simulations are conducted by MATLAB R2020a on a single computer, with an Intel Core i7 processor at 3.6 GHz, a RAM of 16 GB and the Windows 10 operating system.

Figure 5A:
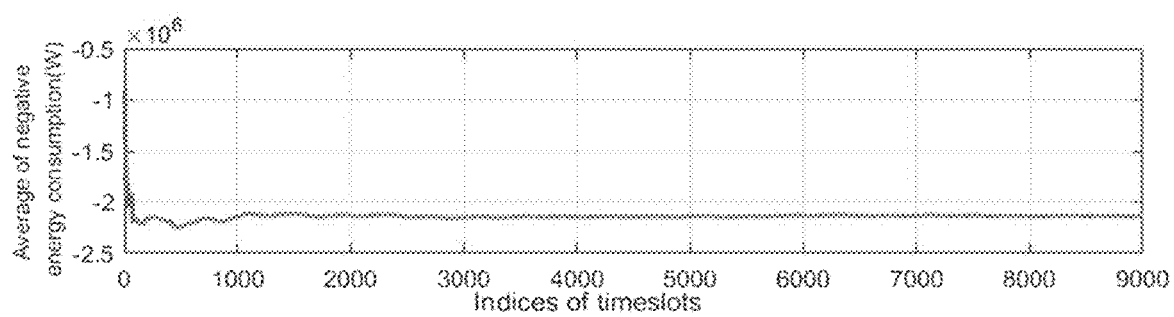
FIG. 5A is a schematic diagram of a curve of a negative value of an average energy consumption over time according to an embodiment of the present disclosure.
Figure 5B:
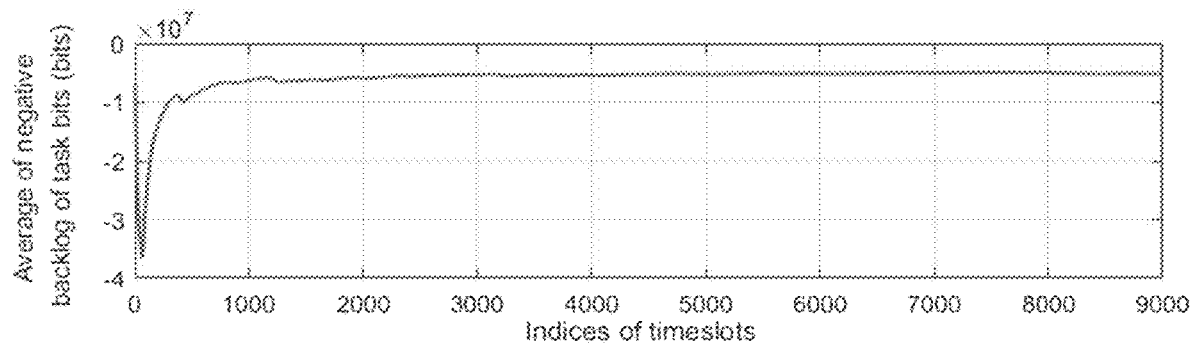
FIG. 5B is a schematic diagram of a curve of a negative value of an average task bit backlog over time according to an embodiment of the present disclosure.

FIG. 5A and FIG. 5B represent changes in an average long-term system energy consumption and task bit backlog in a training period. It can be observed that the average energy consumption and the average task bit backlog can be optimized well within 200 timeslots, ensuring a low energy consumption while reducing the task bit backlog. This indicates that the distributed multi-objective trajectory optimization and offloading scheduling method proposed in this embodiment can achieve a low energy consumption and a low task bit backlog within the system.

Figure 4:
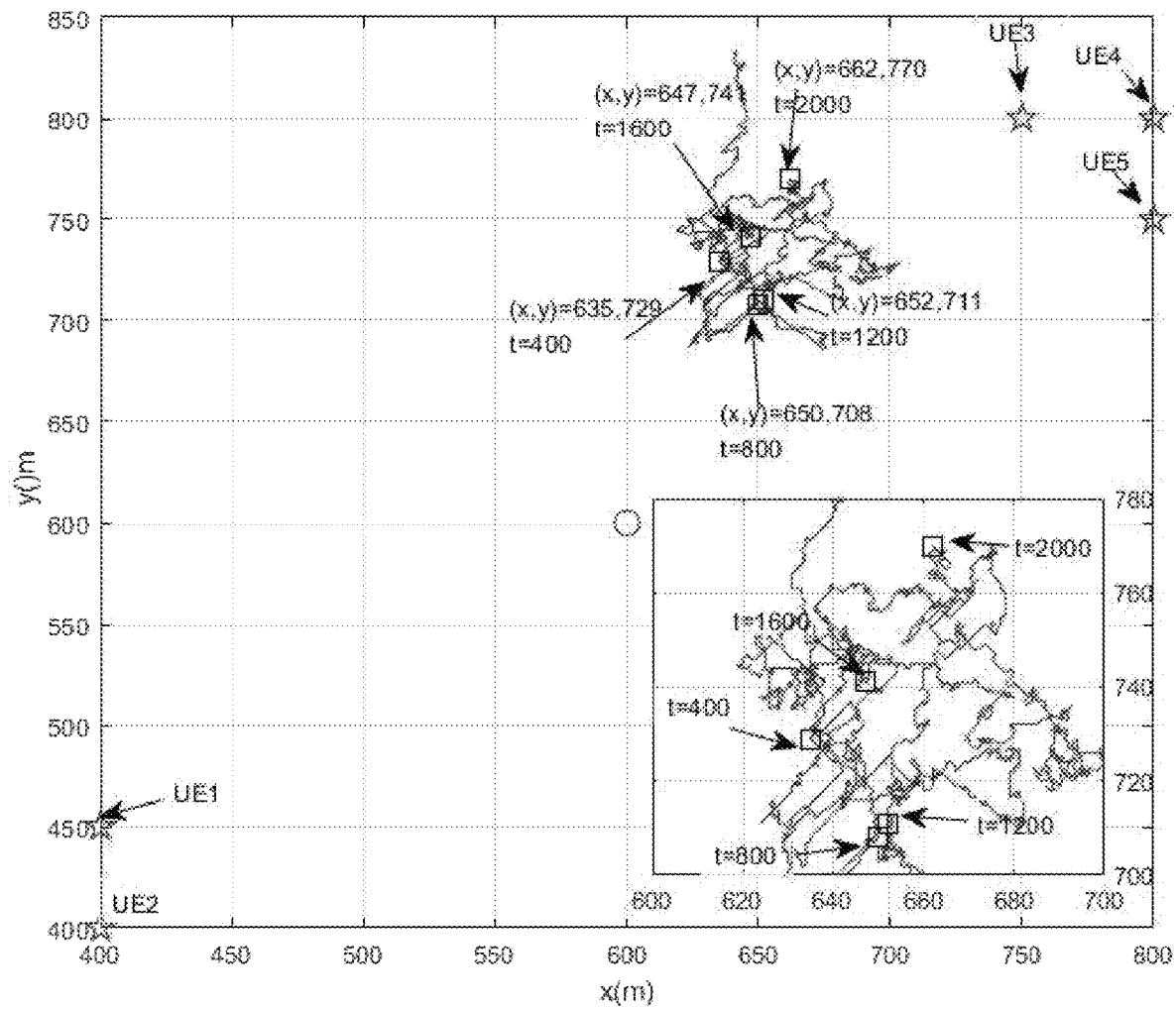
FIG. 4 is a schematic diagram of a motion curve and a location change of a UAV within 2000 timeslots according to an embodiment of the present disclosure.

In addition, it is worth noting that the UAV does not fly back and forth between terrestrial users to provide a data offloading service for the user, as this will reduce a channel gain between a user with a high data volume and the UAV, resulting in a high task bit backlog and a high computation energy consumption. Therefore, as shown in FIG. 4, the UAV ultimately chooses to fly within a small range between users in order to adapt to dynamic data task generation of the terrestrial user.

Embodiment 2

Figure 2:
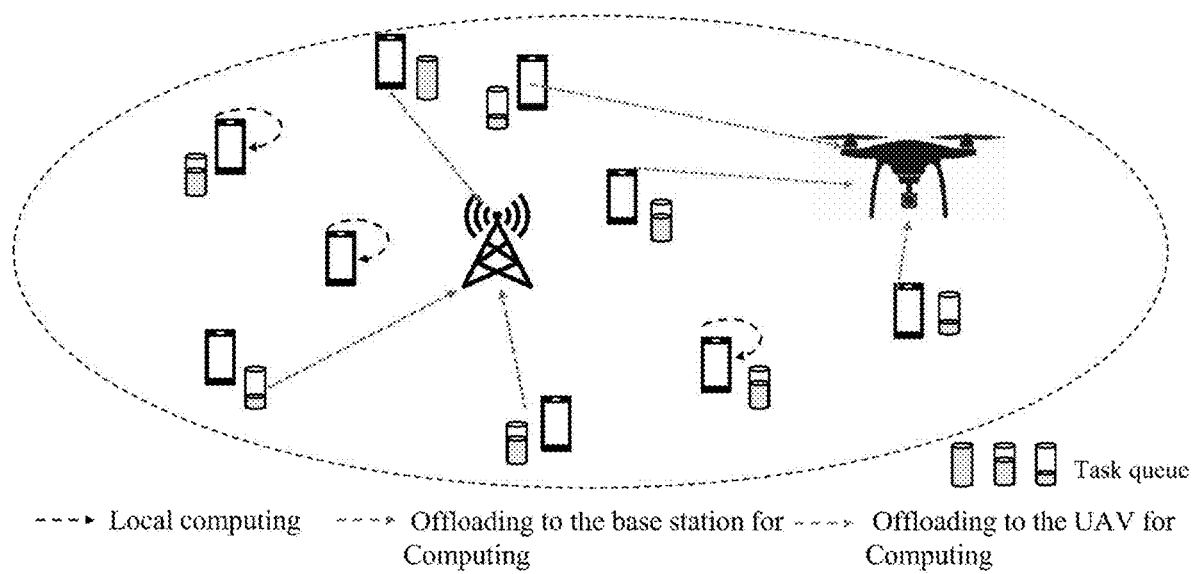
FIG. 2 is an architecture diagram of an air-ground joint trajectory planning and offloading scheduling system for distributed multiple objectives according to the present disclosure.

As shown in FIG. 2, this embodiment provides an air-ground joint trajectory planning and offloading scheduling system for distributed multiple objectives. All devices of the system include a UAV fixed at a flight altitude, a terrestrial BS at a fixed location, and a plurality of terrestrial users at fixed locations. The UAV and the BS jointly serve the plurality of terrestrial users.

The UAV is configured to perform following operations: obtaining current state information, where the state information includes a location of the UAV in current timeslot t and a total amount of unprocessed data of all the devices in previous timeslot t−1; selecting an action by minimizing a total energy consumption of all the devices and a total amount of unprocessed data of all the devices, selecting a flight direction from a preset flight direction set (including up, down, left, right, upper right, lower right, upper left, and lower left), and flying a fixed distance; after task offloading scheduling of the users is completed in the current timeslot t, updating the location as a location in next timeslot t+1; and receiving a feedback for a current action, and obtaining an optimal flying strategy based on the state information and the feedback for the current action in the next timeslot.

The user is configured to perform following operations: before the UAV reaches a new location, obtaining, by each user, current state information; selecting, by all the users, an action in parallel, determining a task offloading scheduling method (including local computing, offloading to the UAV, and offloading to the BS) of each user from a preset offloading strategy set by minimizing the total energy consumption of all the devices and the total amount of the unprocessed data of all the devices, and executing the task offloading scheduling method in the current timeslot t; and receiving the feedback for the current action, and obtaining an optimal offloading strategy based on the state information and the feedback for the current action in the next timeslot.

The total energy consumption of all the devices is calculated according to a following formula:

$$D_t = \sum_{m=1}^{m=M} (D_{m,t}) + D_{UAV,t} + D_{BS,t}$$

where $D_t$ represents a total energy consumption of all the devices in the timeslot t, M represents a quantity of users, m∈{1, 2, . . . , M}, and $D_{m,t}$, $D_{UAV,t}$ and $D_{BS,t}$ respectively represent cumulative computing tasks in queues of user m, the UAV, and the BS in the timeslot t.

The total amount of the unprocessed data of all the devices is calculated according to a following formula:

$$E_t = \sum_{m=1}^{M} \left( (E_{UAV,m,t}^{trans} + E_{UAV,m,t}^{cp}) \cdot \alpha_{m,t,UAV} + \right.$$
$$\left. (E_{BS,m,t}^{trans} + E_{BS,m,t}^{cp}) \cdot \alpha_{m,t,BS} + E_{UE,m,t}^{cp} \cdot \alpha_{m,t,UE} \right)$$

where $E_t$ represents a total amount of unprocessed data of all the devices in the timeslot t, $E_{UAV,m,t}^{trans}$ and $E_{BS,m,t}^{trans}$ respectively represent transmission energy consumptions of offloading a task by the user m to the UAV and the BS in the timeslot t, $E_{UAV,m,t}^{cp}$ and $E_{BS,m,t}^{cp}$ respectively represent energy consumptions of computing the task by the user m on the UAV and the BS in the timeslot t, and $\alpha_{m,t,UE}$, $\alpha_{m,t,UAV}$, and $\alpha_{m,t,BS}$ respectively represent operations of performing local computing, offloading to the UAV, and offloading to the BS by the user m in the timeslot t, where when the local computing is performed, $\alpha_{m,t,UE}=1$, otherwise $\alpha_{m,t,UE}=0$; when the offloading to the UAV is performed, $\alpha_{m,t,UAV}=1$, otherwise $\alpha_{m,t,UAV}=0$; and when the offloading to the BS is performed, $\alpha_{m,t,BS}=1$, otherwise $\alpha_{m,t,BS}=0$.

The feedback for the current action is as follows:

$$\bar{r} = [\bar{E}, \bar{D}]^T$$

$$\bar{E} = \lim_{T \to \infty} \sup \frac{1}{T} \varepsilon \left\{ \sum_{t=0}^{T-1} e_t \right\}$$

$$\bar{D} = \lim_{T \to \infty} \sup \frac{1}{T} \varepsilon \left\{ \sum_{t=0}^{T-1} d_t \right\}$$

where $\bar{r}$ represents a column vector of the feedback, $[\ ]^T$ represents transposition, $\bar{E}$ represents an average feedback for an energy consumption, $\bar{D}$ represents an average feedback for unprocessed data, T represents duration of the task, $$\sup \frac{1}{T}$$

represents an upper bound of $$\frac{1}{T},$$

$\varepsilon\{\ \}$ represents averaging, $e_t = -E_t$, and $d_t = -D_t$.

The optimal flying and offloading strategy is determined according to a following formula:

$$\pi = \text{argmax}_\pi \{w_r^T \bar{r}\}$$

$$w_r = [w_e, w_d]^T$$

where $\pi$ represents the optimal flying and offloading strategy, $w_r$ represents a weight vector, $w_r^T$ represents transposition of $w_r$, and $w_e$ and $w_d$ respectively represent weight values for the energy consumption and an amount of the unprocessed data.

What is described above is merely the preferred implementations of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. An air-ground joint trajectory planning and offloading scheduling method for distributed multiple objectives, wherein in the method, an unmanned aerial vehicle (UAV) fixed at a flight altitude and a terrestrial base station (BS) at a fixed location jointly serve a plurality of terrestrial users at fixed locations, and the method specifically comprises the following steps:

step 1: obtaining, by the UAV, current state information, wherein the state information comprises a location of the UAV in a current timeslot t and a total amount of unprocessed data of all devices in a previous timeslot t−1, and all the devices comprise the UAV, the BS, and the plurality of users;

step 2: selecting, by the UAV, an action, selecting a flight direction from a preset flight direction set by minimizing a total energy consumption of all the devices and a total amount of unprocessed data of all the devices, and flying a fixed distance;

wherein the total energy consumption of all the devices is calculated according to a following formula:

$$D_t = \sum_{m=1}^{m=M} (D_{m,t}) + D_{UAV,t} + D_{BS,t}$$

wherein $D_t$ represents a total energy consumption of all the devices in the timeslot t, M represents a quantity of users, $m \in \{1, 2, \ldots, M\}$, and $D_{m,t}$, $D_{UAV,t}$, and $D_{BS,t}$ respectively represent cumulative computing tasks in queues of a user m, the UAV, and the BS in the timeslot t; and the total amount of the unprocessed data of all the devices is calculated according to a following formula:

$$E_t = \sum_{m=1}^{M} \left( \left( E_{UAV,m,t}^{trans} + E_{UAV,m,t}^{cp} \right) \cdot \alpha_{m,t,UAV} + \left( E_{BS,m,t}^{trans} + E_{BS,m,t}^{cp} \right) \cdot \alpha_{m,t,BS} + E_{UE,m,t}^{cp} \cdot \alpha_{m,t,UE} \right)$$

wherein $E_t$ represents a total amount of unprocessed data of all the devices in the timeslot t, $E_{UAV,m,t}^{trans}$ and $E_{BS,m,t}^{trans}$ respectively represent transmission energy consumptions of offloading a task by the user m to the UAV and the BS in the timeslot t, $E_{UAV,m,t}^{cp}$ and $E_{BS,m,t}^{cp}$ respectively represent energy consumptions of computing the task by the user m on the UAV and the BS in the timeslot t, and $\alpha_{m,t,UE}$, $\alpha_{m,t,UAV}$, and $\alpha_{m,t,BS}$ respectively represent operations of performing local computing, offloading to the UAV, and offloading to the BS by the user m in the timeslot t, wherein when the local computing is performed, $\alpha_{m,t,UE}=1$, otherwise $\alpha_{m,t,UE}=0$; when the offloading to the UAV is performed, $\alpha_{m,t,UAV}=1$, otherwise $\alpha_{m,t,UAV}=0$; and when the offloading to the BS is performed, $\alpha_{m,t,BS}=1$, otherwise $\alpha_{m,t,BS}=0$;

step 3: before the UAV reaches a new location, obtaining, by each user, current state information;

step 4: selecting, by all the users, an action in parallel, determining a task offloading scheduling method of each user from a preset offloading strategy set by minimizing the total energy consumption of all the devices and the total amount of the unprocessed data of all the devices, and executing the task offloading scheduling method in the current timeslot t;

step 5: after task offloading scheduling of the users is completed in the current timeslot t, updating the location of the UAV as a location in a next timeslot t+1, wherein the UAV and each user receive a feedback for a current action;

wherein the feedback for the current action is as follows:

$$\bar{r} = [\bar{E}, \bar{D}]^T$$

$$\bar{E} = \lim_{T \to \infty} \sup \frac{1}{T} \varepsilon \left\{ \sum_{t=0}^{T-1} e_t \right\}$$

-continued $$\bar{D} = \lim_{T \to \infty} \sup \frac{1}{T} \varepsilon \left\{ \sum_{t=0}^{T-1} d_t \right\}$$

wherein $\bar{r}$ represents a column vector of the feedback, $[\ ]^T$ represents transposition, $\bar{E}$ represents an average feedback for an energy consumption, $\bar{D}$ represents an average feedback for unprocessed data, T represents duration of the task, $$\sup \frac{1}{T}$$

represents an upper bound of $$\frac{1}{T},$$

$\varepsilon\{\ \}$ represents averaging, $e_t = -E_t$, and $d_t = -D_t$; and step 6: repeating steps 1 to 5 in each timeslot to obtain an optimal flying and offloading strategy based on the state information and the feedback for the current action, wherein the flying and offloading strategy comprises the flight direction of the UAV and the task offloading scheduling method of each user.

2. The air-ground joint trajectory planning and offloading scheduling method for distributed multiple objectives according to claim 1, wherein the flight direction set comprises eight flight directions: up, down, left, right, upper right, lower right, upper left, and lower left; and the offloading strategy set comprises three task offloading scheduling methods: local computing, offloading to the UAV, and offloading to the BS.

3. The air-ground joint trajectory planning and offloading scheduling method for distributed multiple objectives according to claim 1, wherein the optimal flying and offloading strategy is determined according to a following formula:

$$\pi = \mathrm{argmax}_\pi \{w_r^T \bar{r}\}$$

$$w_r = [w_e, w_d]^T$$

wherein $\pi$ represents the optimal flying and offloading strategy, $w_r$ represents a weight vector, $w_r^T$ represents transposition of $w_r$, and $w_e$ and $w_d$ respectively represent weight values for the energy consumption and an amount of the unprocessed data.

4. An air-ground joint trajectory planning and offloading scheduling system for distributed multiple objectives, wherein all devices of the system comprise a UAV fixed at a flight altitude, a terrestrial BS at a fixed location, and a plurality of terrestrial users at fixed locations, and the UAV and the BS jointly serve the plurality of terrestrial users;

the UAV is configured to perform following operations:
obtaining current state information, wherein the state information comprises a location of the UAV in a current timeslot t and a total amount of unprocessed data of all the devices in a previous timeslot t−1;
selecting an action by minimizing a total energy consumption of all the devices and a total amount of unprocessed data of all the devices, selecting a flight direction from a preset flight direction set, and flying a fixed distance; after task offloading scheduling of the users is completed in the current timeslot t, updating the location as a location in a next timeslot t+1; and receiving a feedback for a current action, and obtaining an optimal flying strategy based on the state information and the feedback for the current action in the next timeslot;

wherein the total energy consumption of all the devices is calculated according to a following formula:

$$D_t = \sum_{m=1}^{m=M} (D_{m,t}) + D_{UAV,t} + D_{BS,t}$$

wherein $D_t$ represents a total energy consumption of all the devices in the timeslot t, M represents a quantity of users, $m \in \{1, 2, \ldots, M\}$, and $D_{m,t}$, $D_{UAV,t}$, and $D_{BS,t}$ respectively represent cumulative computing tasks in queues of a user m, the UAV, and the BS in the timeslot t; and the total amount of the unprocessed data of all the devices is calculated according to a following formula:

$$E_t = \sum_{m=1}^{M} \left( (E_{UAV,m,t}^{trans} + E_{UAV,m,t}^{cp}) \cdot \alpha_{m,t,UAV} + (E_{BS,m,t}^{trans} + E_{BS,m,t}^{cp}) \cdot \alpha_{m,t,BS} + E_{UE,m,t}^{cp} \cdot \alpha_{m,t,UE} \right)$$

wherein $E_t$ represents a total amount of unprocessed data of all the devices in the timeslot t, $E_{UAV,m,t}^{trans}$ and $E_{BS,m,t}^{trans}$ UAV respectively represent transmission energy consumptions of offloading a task by the user m to the UAV and the BS in the timeslot t, $E_{UAV,m,t}^{cp}$ and $E_{BS,m,t}^{cp}$ respectively represent energy consumptions of computing the task by the user m on the UAV and the BS in the timeslot t, and $\alpha_{m,t,UE}$, $\alpha_{m,t,UAV}$, and $\alpha_{m,t,BS}$ respectively represent operations of performing local computing, offloading to the UAV, and offloading to the BS by the user m in the timeslot t, wherein the local computing is performed, $\alpha_{m,t,UE}=1$, otherwise $\alpha_{m,t,UE}=0$; when the offloading to the UAV is performed, $\alpha_{m,t,UAV}=1$, otherwise $\alpha_{m,t,UAV}=0$; and when the offloading to the BS is performed, $\alpha_{m,t,BS}=1$, otherwise $\alpha_{m,t,BS}=0$;

wherein the feedback for the current action is as follows:

$$\bar{r} = [\bar{E}, \bar{D}]^T$$

$$\bar{E} = \lim_{T \to \infty} \sup \frac{1}{T} \varepsilon \left\{ \sum_{t=0}^{T-1} e_t \right\}$$

$$\bar{D} = \lim_{T \to \infty} \sup \frac{1}{T} \varepsilon \left\{ \sum_{t=0}^{T-1} d_t \right\}$$

wherein $\bar{r}$ represents a column vector of the feedback, $[\ ]^T$ represents transposition, $\bar{E}$ represents an average feedback for an energy consumption, $\bar{D}$ represents an average feedback for unprocessed data, T represents duration of the task, $$\sup \frac{1}{T}$$

represents an upper bound of $$\frac{1}{T},$$

$\varepsilon\{\ \}$ represents averaging, $e_f = -E_f$, and $d_f = -D_f$; and the user is configured to perform following operations: before the UAV reaches a new location, obtaining, by each user, current state information; selecting, by all the users, an action in parallel, determining a task offloading scheduling method of each user from a preset offloading strategy set by minimizing the total energy consumption of all the devices and the total amount of the unprocessed data of all the devices, and executing the task offloading scheduling method in the current timeslot t; and receiving the feedback for the current action, and obtaining an optimal offloading strategy based on the state information and the feedback for the current action in the next timeslot.

5. The air-ground joint trajectory planning and offloading scheduling system for distributed multiple objectives according to claim 4, wherein the flight direction set comprises eight flight directions: up, down, left, right, upper right, lower right, upper left, and lower left; and the offloading strategy set comprises three task offloading scheduling methods: local computing, offloading to the UAV, and offloading to the BS.

6. The air-ground joint trajectory planning and offloading scheduling system for distributed multiple objectives according to claim 4, wherein the optimal flying strategy and the optimal offloading strategy are determined according to a following formula:

$$\pi = \mathrm{argmax}_\pi \{w_r^T \bar{r}\}$$

$$w_r = [w_e, w_d]^T$$

wherein $\pi$ represents the optimal flying and offloading strategy, $w_r$ represents a weight vector, $w_r^T$ represents transposition of $w_r$, and $w_e$ and $w_d$ respectively represent weight values for the energy consumption and an amount of the unprocessed data.

* * * * *